United States Patent [19]
Campbell

[11] Patent Number: 5,858,497
[45] Date of Patent: Jan. 12, 1999

[54] ROLL ROOFING TIN CAP STRIP

[76] Inventor: Van-De R. Campbell, 1330 NW. 56th Ave., Lauderhill, Fla. 33313

[21] Appl. No.: 760,785

[22] Filed: Dec. 5, 1996

[51] Int. Cl.⁶ ....................................................... B32B 3/10
[52] U.S. Cl. .......................... 428/64.1; 428/131; 428/195; 206/445; 52/408
[58] Field of Search .................................. 428/64.1, 131, 428/195; 52/408; 206/445

Primary Examiner—Alexander Thomas

[57] ABSTRACT

A device for use as a part of the securing process of roofing felt (tar paper, roll roofing, etc.) comprising a ribbon like strip (FIG. 1) on which tin caps like devices (2) are evenly spaced, a lateral center line (1) and several registration lines (4). The use of this device will insure the even spacing of tin caps on a straight line.

3 Claims, 1 Drawing Sheet

U.S. Patent  Jan. 12, 1999  5,858,497
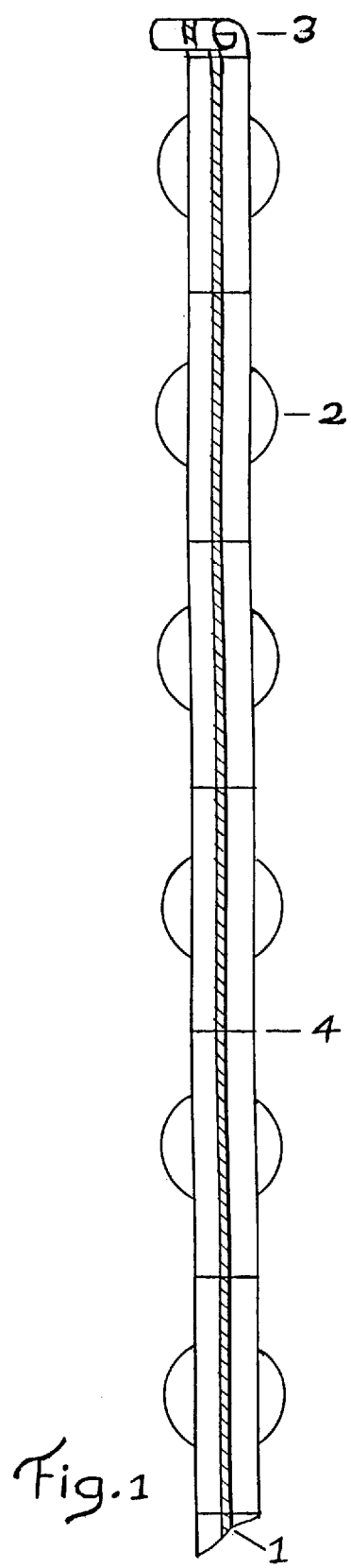
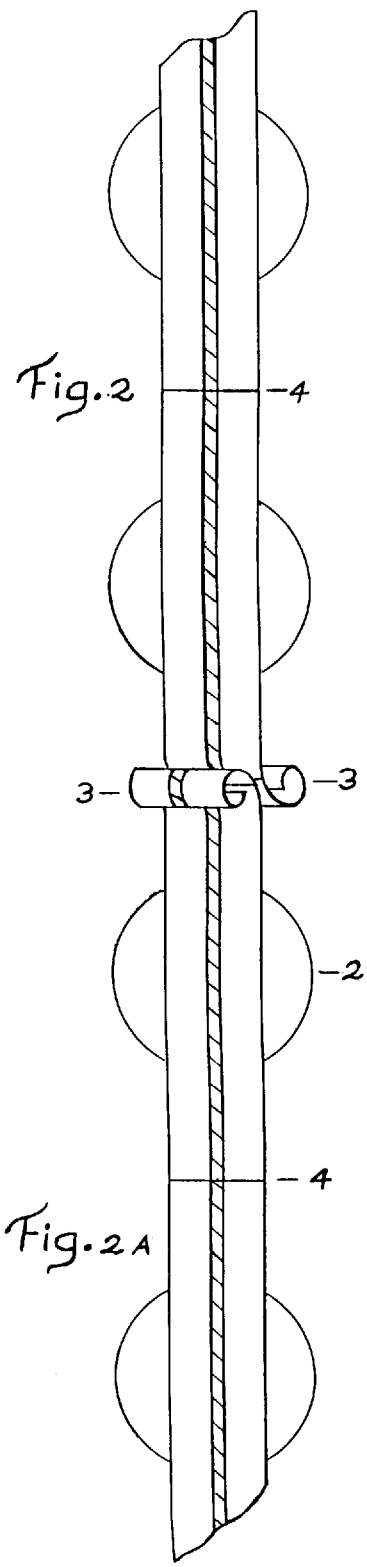

ROLL ROOFING TIN CAP STRIP

BACKGROUND

1. Field of Invention

This invention relates to the placement of tin cap like devices on a ribbon like material wherein said tin caps are evenly spaced and secured on a straight line; and wherein the spacing between the tin caps are in accordance with building codes.

2. Description of Prior Art

Over the years, many roofing inspectors have condemned the installation of roofing felt; in some cases this occurs when the randomly placed tin caps were not positioned in accordance to building codes.

Object and Advantages

Accordingly, I claim the following as my object and advantages of the invention: to provide a product enabling roofers to in stall tin caps which are evenly spaced and can be positioned on a straight line; requiring on assemblage, the use of this device will solve the problem of randomly placed tin caps, while minimizing the waste of tin caps, manpower and time.

BRIEF DESCRIPTION OF THE DRAWINGS

FIG. 1 shows a strip with a lateral center line (1); several lines which are evenly spaced between tin caps, serving as registration marks (4) and whereupon said strip, several evenly spaced circles are attached (2).

FIG. 2 shows one end of the underlapping process when a strip is to be continued.

FIG. 2A shows the overlapping process of FIG. 2.

SINGLE PIECE DESCRIPTION

FIG. 1 shows a section of the device and is comprised of a strip (made of a suitable flexable material); several circles (made of tin or the like); a lateral center line and several evenly spaced registration lines between tin caps.

FIG. 2 and FIG. 2A are the same as FIG. 1 but serve to illustrate the joining of two units.

Unit Assemblage and Operation

On assemblage is necessary to utilize this device; simply unroll the device and position where needed then fasten by using nails, staplers or the like. At the end of a strip and wherein continuation is necessary, position the first registration line of the continuating strip to the last registration line of the installed strip and continue the fastening process. Once these processes are completed the tin caps will be evenly spaced.

Recommended Use

The device herein mentioned is intended to be used as a part of the securing process of roofing felt on a roof. While the above descriptions contains many specifics, the reader should not conclude these as limitations on the scope of the invention but rather, a present conclusive approach in the development of the invention, for known is that there are times when roofing materials such as "felt" is used on the sides of buildings; furthermore, skilled artisans will envision that the same resolution can be achived if the tin caps of FIG. 1 are removed from the strip and said strip is marked and/or perforated at even intervals. Accordingly, the reader is therefore requested to determine the full scope of the invention by the appended claims and their legal equivalents and not only by the examples which have given.

I claim:

1. A strip comprising bilateral sides and two ends having tin cap devices evenly spaced and secured on the strip and lines, marks or perforations on the strip centered between the tin caps.

2. The strip of claim 1, wherein the strip has a lateral center line.

3. The strip of claim 2 wherein the device is manifested as a single unit.

* * * * *